Inventor:
Roger W. Orlomoski,
By Russell, Chittick & Pfund
Attorneys

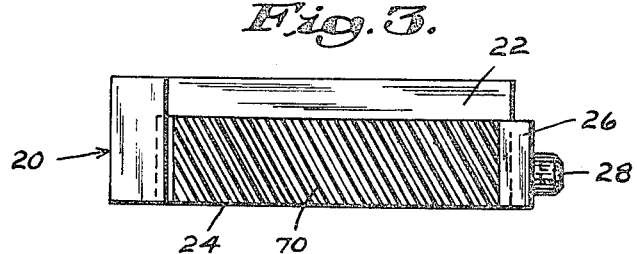
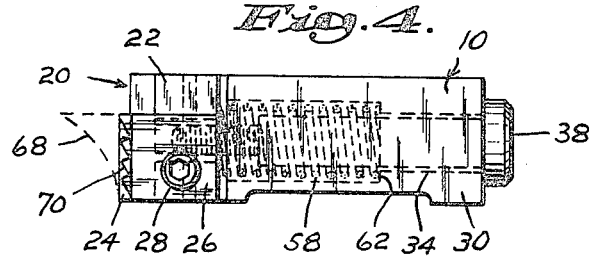
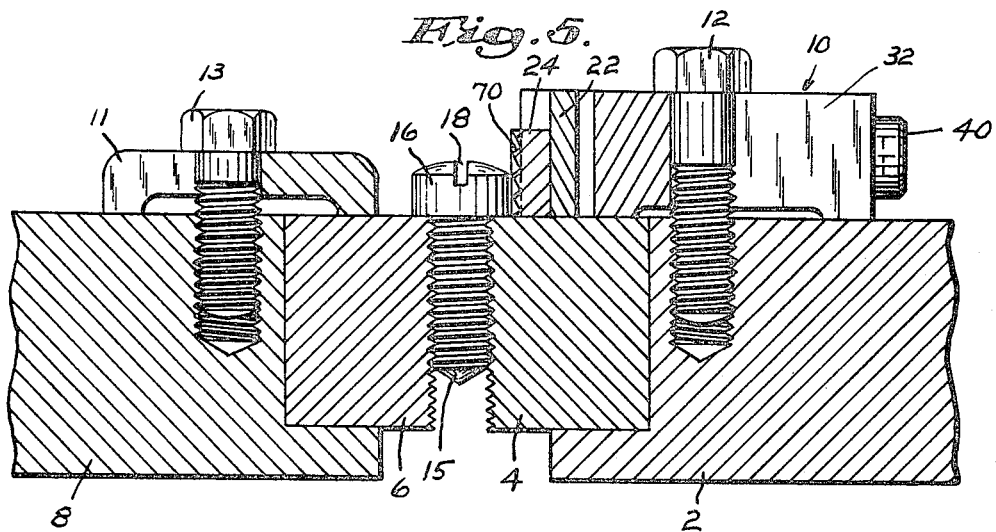

United States Patent Office 3,429,162
Patented Feb. 25, 1969

3,429,162
MEANS FOR DEBURRING SCREW HEADS
Roger W. Orlomoski, Paxton, Mass., assignor to Reed Rolled Thread Die Co., Holden, Mass., a corporation of Massachusetts
Filed Dec. 19, 1966, Ser. No. 602,839
U.S. Cl. 72—90    5 Claims
Int. Cl. B21b *17/04;* B26d *7/00*

ABSTRACT OF THE DISCLOSURE

The object of this invention is to provide a mechanism which will remove burrs from the slotted head of a screw blank while a thread is being formed on the blank by the well known thread rolling process. The invention may be used to deburr all types of screw heads among the most common of which are fillister heads, pan heads, oval heads, flat heads slotted conventionally and hexagon heads slotted across the corners.

BACKGROUND OF THE INVENTION

Field of the invention

The invention is particularly applicable in the manufacture of screws of various sizes and configurations produced by the thread rolling process in which the heads have been previously slotted to receive a screwdriver. The slot in the screw head is ordinarily made by passing the head across a sawblade. The sawing operation inveriably produces a burr at the exit side. The burr may vary in size depending on the condition of the saw, the material of the screw, etc. The headed, slotted blanks are then fed in succession to a thread rolling machine which rolls the required thread on the shank of the blank. All of the foregoing is conventional and well understood in the art.

The present invention utilizes an auxiliary mechanism associated with one of the dies of the thread rolling machine, which is effective to remove the burr at the end of the slot as the head rotates during travel of the shank along and betwen the thread rolling dies.

The invention is also effective to remove surplus metal in the nature of a burr that may have been extruded from the sides of the screw head if the slot had been produced by pressing it therein instead of cutting it by use of a saw.

Description of the prior art

The problem of removing burrs or other unwanted material from the heads of screws and bolts has been present for many years and efforts have been made to produce machines which will accomplish the result now achieved by the present invention. The most pertinent prior art of which applicant is aware is the United States patent to I. W. Atchinson and F. M. Steimer, No. 1,296,154 of Mar. 4, 1919, for Mechanism for Removing Burrs. Atchinson et al. shows a resilient file mechanism for removing burrs from screw heads as the blanks are being threaded by a conventional thread rolling machine. This early patent recognizes the likelihood of eccentricity in the screw heads that are being deburred. However, there is no disclosure therein of applicant's particular deburring unit and mounting means therefor.

Applicant's invention, as distinguished from the prior art, provides a deburring unit which is mounted on top of either of the two dies of a thread rolling machine; that is, it can be mounted on top of the fixed die or the movable die. The deburring unit which engages the side of the screw head to remove the burr or extruded material is mounted on a special mechanism that permits lateral movement of the unit as the periphery of the rotating screw head slides past the cutting face of the deburring unit. The pressure against the screw head is substantially uniform over the full length of engagement. The cutting face follows the side of the screw head whether it be concentric or eccentric with respect to the body of the blank. The deburring unit is arranged to apply enough cutting action to remove the burr or surplus material without removing any part of the body of the screw head, except possibly to a negligible and unobjectionable degree. The invention herein disclosed is of an adjustable and replaceable nature so that it may be used to deburr screw heads on blanks having heads of various sizes and shapes. Thus no matter what kind blank is being used in the thread rolling machine, the deburring mechanism of the present invention is applicable.

BRIEF DESCRIPTION OF THE DRAWINGS

In the drawings.

FIG. 3 is a front elevational view of FIG. 2.

FIG. 4 is a side elevational view looking from the right of FIGS. 2 and 3.

FIG. 5 is a vertical cross section of the mechanism taken on the line 5—5 of FIG. 1.

DESCRIPTION OF THE PREFERRED EMBODIMENT

Figure 1:
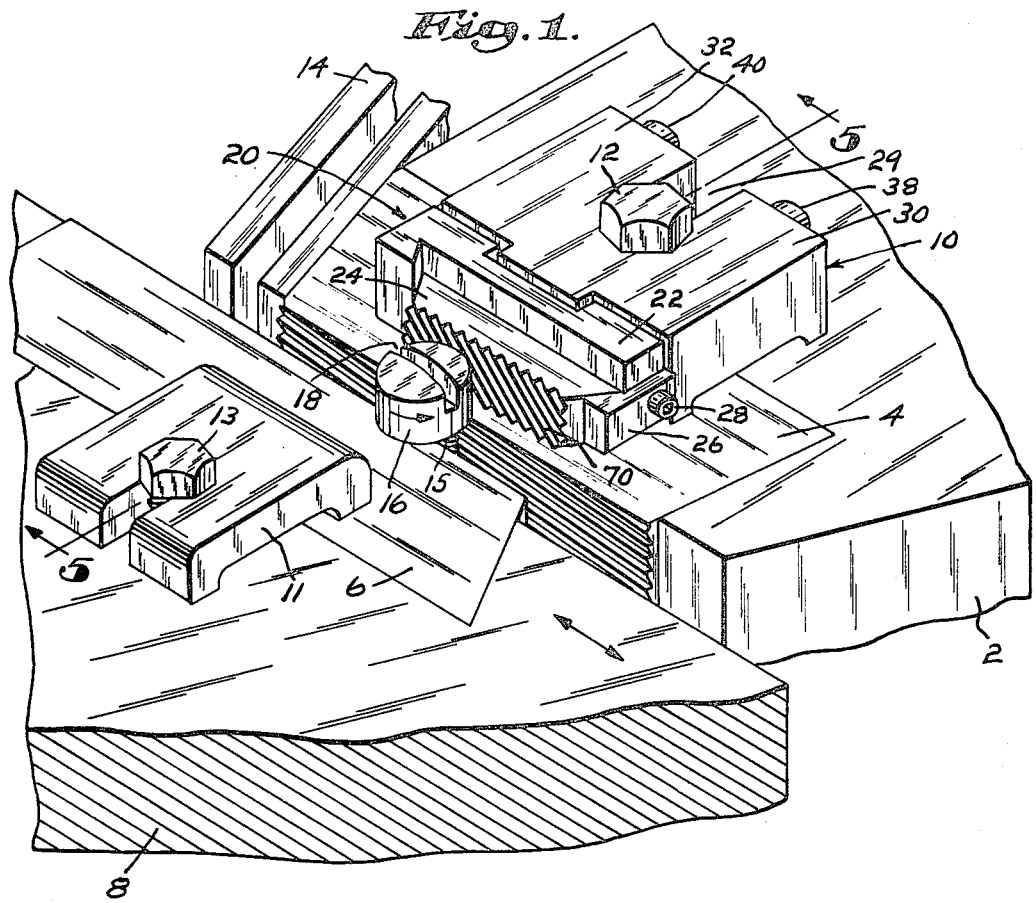
FIG. 1 is a fragmentary perspective view of a pair of thread rolling dies mounted in their holders and shown in the process of rolling a thread on a headed blank. The deburring mechanism is illustrated in its position on top of the fixed right hand die and so arranged to remove any burrs or extruded metal that may be present beyond the normal sides of the screw head.
Figure 2:
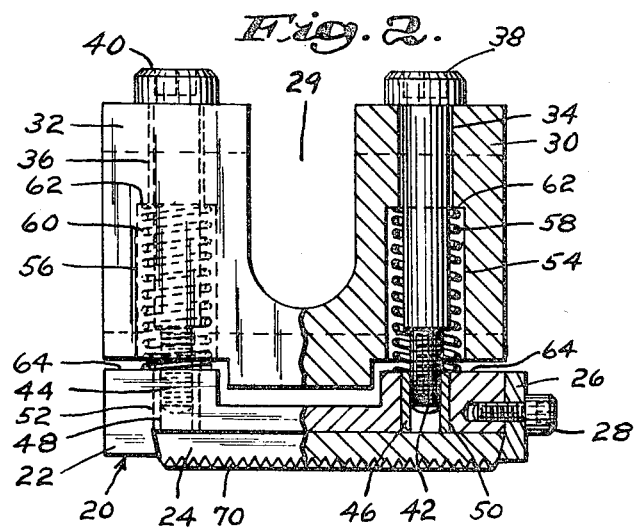
FIG. 2 is a plan view of the deburring unit which constitutes the invention. This view is broken away in part to show interior detail.

A preferred embodiment is shown in the drawings which have been briefly referred to above. In FIG. 1, 2 represents the fixed portion of the thread rolling machine in which is positioned the fixed die 4. This die cooperates with die 6 which is mounted in the reciprocating part 8 of the machine.

Dies 4 and 6 are of conventional construction and are held securely in position in the machine by clamps 10 and 11 secured by bolts 12 and 13 respectively. Clamp 12 is of conventional dimensions, but clamp 10 is larger to accommodate the deburring unit as will be explained. Blank feed rails 14 are provided by means of which blanks 15 are introduced one after the other to the dies 4 and 6 in conventional manner.

The headed element 15 shown in FIGS. 1 and 5 is representative of any headed blank to which threads are to be applied in conventional manner by the dies 4 and 6. The heads 16 of these blanks have been slotted as at 18 by saws or otherwise before they arrive at the start of the threading position via the blank feed rails 14. As previously noted, the processes producing the slots 18 customarily result in the formation of a burr at one end of the slot, or in slightly extruded metal portions at one or both ends.

In order to remove the burr or excess metal at one or both ends of the slot 18, the deburring unit indicated generally at 20 has been provided. This unit consists of an insert holder 22 and a deburring insert 24 mounted thereon and held firmly in position by an insert end clamp 26 secured by a socket head cap screw 28. This deburring unit is affixed in spaced relation to one side of clamp 10 by the following mechanism. The clamp is slotted as at 29 to form legs 30 and 32 which are drilled horizontally at 34 and 36 to receive socket-headed shoulder screws 38 and 40. These screws threaded over a portion of their length at 42 and 44 are screwed into the correspondingly tapped inserts 46 and 48 which have previously been threaded into and locked in appropriate horizontal openings 50 and 52 that extend horizontally through the insert holder 22. The horizontal openings through the clamp 10 are enlarged at 54 and 56 to receive compression springs 58 and 60. One end of each spring abuts against shoulder 62 and the other end against the rear face 64 of the insert holder 22, thus holding the unit 20 away from the clamp 10 to the extent permitted by the setting of screws 38 and 40.

When the clamp 10 is in the position shown in FIGS. 1 and 5, it is held tightly against the die 4 by the headed bolt 12 that straddles the space 29 between legs 30 and 32. The screws 38 and 40 may be rotated to adjust the lateral position of the deburring insert 24 so that it will encounter and be spring pressed against the side of the head 16 as it rolls past while the threads are being formed on the shank of the blank 15.

The deburring insert 24 has on its face cutting teeth 70. The angle between the sides of the teeth is preferably 60 degrees, and the angle of the teeth to the horizontal is preferably 30 degrees. It should be understood, however, that the construction of the teeth of the deburring insert is not limited to any particular type or angularity of teeth. The vertical profile of the teeth 68 may be made to conform not only to the fillister type head shown, but also to pan heads, oval heads, flat heads and the corners of hexagon heads. One alternative profile is suggested by the dotted line 68 in FIG. 4. The cutting teeth must be adequate to remove the burr or extruded metal from the end of the screw slot as the rotating head moves in cutting relation to the deburring insert.

The manner in which the insert holder 22 is mounted on and in spaced relation to clamp 10 permits as much sideways motion of the deburring insert as is necessary to take care of any eccentricity in the screw head. The compression springs 58 and 60 are of such strength and length that the deburring insert 24 will follow at substantially uniform pressure any eccentric movement of the side of the head 16 against which the insert presses in a manner resulting in a removal of the burrs or extruded material without causing any appreciable removal of metal from other parts of the circumference of the head.

In setting up the machine for operation, the machine should be stopped so that a blank fed to the dies through the feed rails 14 will be at the position shown in FIG. 1 and out of contact with insert 24. The screws 38 and 40 may then be unscrewed from inserts 50 and 52 enough to bring the deburring insert teeth 70 against the side of the screw head 16. The adjustment when correct will have the heads of screws 38 and 40 out of engagement with the vertical surfaces of the ends of legs 30 and 32. Then as the screw head rotates against the teeth 70 of deburring insert 24, the latter will move laterally to the extent necessary to follow the eccentricity, if any, of the screw head, with springs 58 and 60 compressing or extending slightly all the while exerting the necessary pressure on the side of the screw head to remove burrs or extruded metal adjacent to the screwdriver slot.

If the deburring insert becomes dull, it may be readily replaced by unscrewing capscrew 28, removing end clamp 26, replacing the insert and then securing the insert by replacing of clamp 26 and screw 28. Similarly, when a blank having a different type of screw head is being threaded, an insert of corresponding configuration will be substituted.

While the deburring unit 20 has been mounted on top of fixed die 4, it could just as well be mounted above the movable die 6. This, however, is not preferred because it would preclude adjustment of the deburring insert during operation of the machine.

It is my intention to cover all changes and modifications of the example of the invention herein chosen for purposes of the disclosure which do not constitute departures from the spirit and scope of the invention.

I claim:
1. Means for removing unwanted metal from the periphery of the head of a screw blank simultaneously with the creation of a thread on the blank by rolling the same between a pair of thread rolling dies operatively mounted in a conventional thread rolling machine, said means comprising a deburring unit held by mounting means on the top of one of the said dies, said deburring unit having a metal cutting face extending parallel to the line of movement of said blank, said mounting means comprising a clamp for securing said one die in its normal operative position in said machine, said clamp having associated therewith other means for adjustably and resiliently securing said deburring unit alongside said clamp at a position where its face will be engaged in deburring relation by the head of said blank as said blank is rotating between said dies while the threads are being formed thereon, said other means comprising spaced horizontal bores extending through said clamp, threaded openings in said deburring unit aligned with said bores, headed threaded elements in said bores which are screwed into said threaded openings to hold said deburring unit loosely connected to said clamp, and springs interposed between said clamp and deburring unit urging said unit away from said clamp but permitting movement toward said clamp to the extent required by the pressure of an eccentric screw head as it passes along the cutting face of said deburring unit.

2. A combination of clamp and deburring unit set forth in claim 1 further characterized in that said springs are long in relation to the reciprocating movement of said deburring unit caused by said eccentric screw head whereby the pressure of said cutting face against said rotating screw head will be substantially constant.

3. The combination of clamp and deburring unit set forth in claim 1 in which said deburring unit comprises an insert holder which includes said threaded openings and a deburring insert removably attached to said holder.

4. The combination of clamp and deburring unit set forth in claim 1, said springs being helical compression springs and surrounding said threaded elements, the bores through said clamp being large enough to receive said springs, one end of each said spring pressing against said clamp and the other end pressing against said deburring unit.

5. The combination of clamp and deburring unit set forth in claim 1, said clamp having a slot extending in a direction transversely of said dies between said spaced horizontal parallel bores, said slot permitting gross adjustment of said clamp and deburring unit in relation to said one die.

References Cited
UNITED STATES PATENTS

| | | | |
|---|---|---|---|
| 1,296,154 | 3/1919 | Atchison et al. | 72—90 |
| 1,977,556 | 10/1934 | Hogue | 72—464 |
| 2,852,788 | 9/1958 | Putetti | 10—6 |
| 3,183,700 | 5/1965 | Kettner | 10—6 X |

MILTON S. MEHR, *Primary Examiner.*

U.S. Cl. X.R.

10—5